(12) United States Patent
Lim et al.

(10) Patent No.: US 11,226,577 B2
(45) Date of Patent: Jan. 18, 2022

(54) CONTROLLING OPERATION OF IMAGE FORMING APPARATUS ACCORDING TO TONER REFILL MODE

(71) Applicant: Hewlett-Packard Development Company, L.P., Spring, TX (US)

(72) Inventors: Mok Hwa Lim, Seongnam-si (KR); Cheol Yon Won, Seongnam-si (KR)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 17/051,867

(22) PCT Filed: Oct. 19, 2018

(86) PCT No.: PCT/KR2018/012377
§ 371 (c)(1),
(2) Date: Oct. 30, 2020

(87) PCT Pub. No.: WO2019/240333
PCT Pub. Date: Dec. 19, 2019

(65) Prior Publication Data
US 2021/0240121 A1      Aug. 5, 2021

(30) Foreign Application Priority Data
Jun. 14, 2018   (KR) .................... 10-2018-0068402

(51) Int. Cl.
*G03G 15/00* (2006.01)
(52) U.S. Cl.
CPC ....... *G03G 15/556* (2013.01); *G03G 15/5016* (2013.01)

(58) Field of Classification Search
CPC ............................................. G03G 2215/0697
See application file for complete search history.

(56) References Cited

U.S. PATENT DOCUMENTS

| 6,229,975 B1 | 5/2001 | Wilhelm et al. |
| 6,275,664 B1 | 8/2001 | Wolf et al. |
| 2007/0146398 A1* | 6/2007 | Igarashi ............... B41J 2/17566 347/7 |

(Continued)

FOREIGN PATENT DOCUMENTS

| EP | 1 179 432 A1 | 2/2002 |
| EP | 1 335 252 A2 | 8/2003 |

(Continued)

*Primary Examiner* — Victor Verbitsky
(74) *Attorney, Agent, or Firm* — Jefferson IP Law, LLP

(57) ABSTRACT

An image forming device and an operating method are provided. The operating method included outputting a notification indicating that a cartridge in an image forming device needs to be refilled with toner, in accordance with the notification, performing a preparatory operation for entering a refill mode when it is determined that an operation mode of the image forming device is to be switched to the refill mode for refilling the cartridge with toner, when the preparatory operation is completed, controlling the image forming device such that only an operation related to the toner refilling is performed according to the refill mode, and when the refill mode is terminated, switching the operation mode of the image forming device to a job mode for performing a predetermined job in the image forming device.

19 Claims, 10 Drawing Sheets

(56) References Cited

U.S. PATENT DOCUMENTS

| | | |
|---|---|---|
| 2011/0200364 A1 | 8/2011 | Fukui |
| 2012/0027423 A1 | 2/2012 | Kawai |
| 2013/0028617 A1* | 1/2013 | Fukuoka .............. G03G 15/502 399/27 |
| 2013/0108285 A1 | 5/2013 | Spink et al. |
| 2013/0257972 A1* | 10/2013 | Kubo .................. B41J 2/04548 347/19 |

FOREIGN PATENT DOCUMENTS

| | | |
|---|---|---|
| JP | H09-44037 A | 2/1997 |
| JP | H09-138555 A | 5/1997 |
| JP | H10-55100 A | 2/1998 |
| JP | 11-327274 A | 11/1999 |
| JP | 2000-227704 A | 8/2000 |
| JP | 2000-310903 A | 11/2000 |
| JP | 2005-338386 A | 12/2005 |
| JP | 2006-53230 A | 2/2006 |

\* cited by examiner

[Fig. 1]
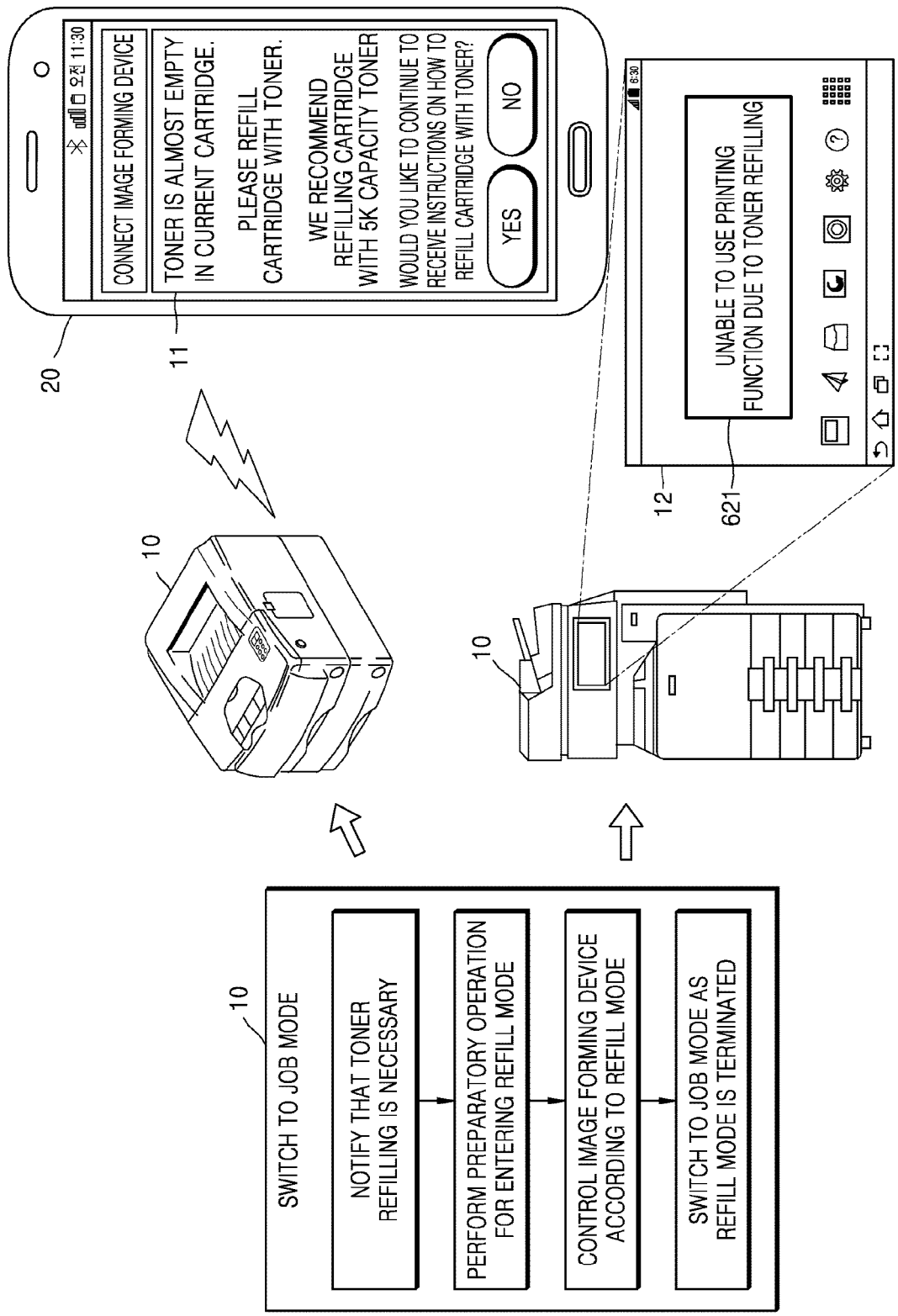

[Fig. 2]
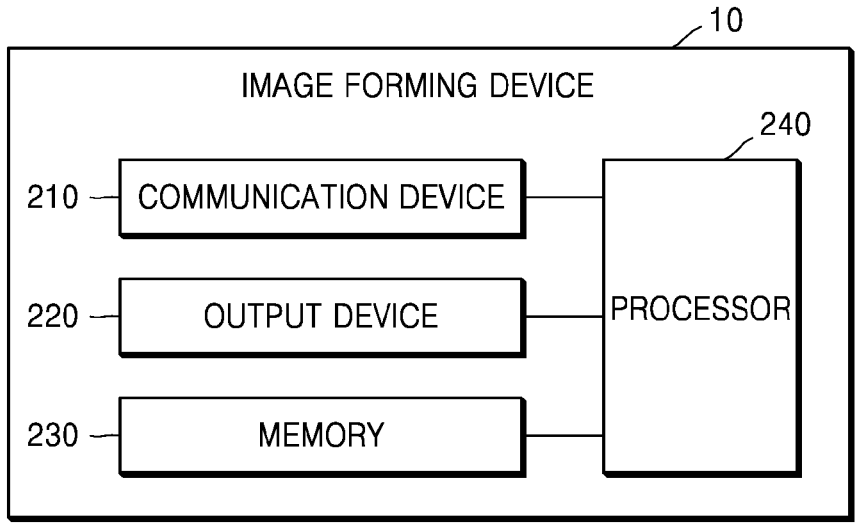
[Fig. 3]
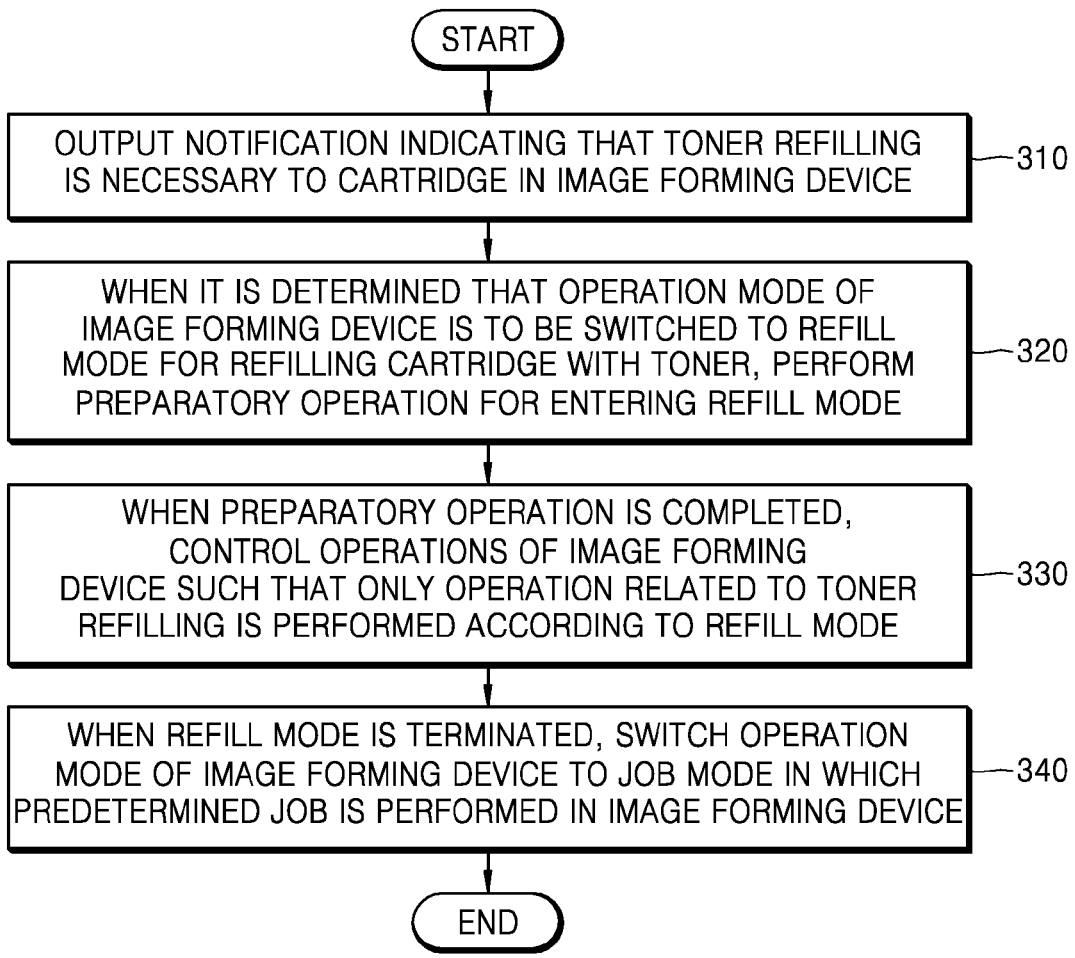

[Fig. 4]
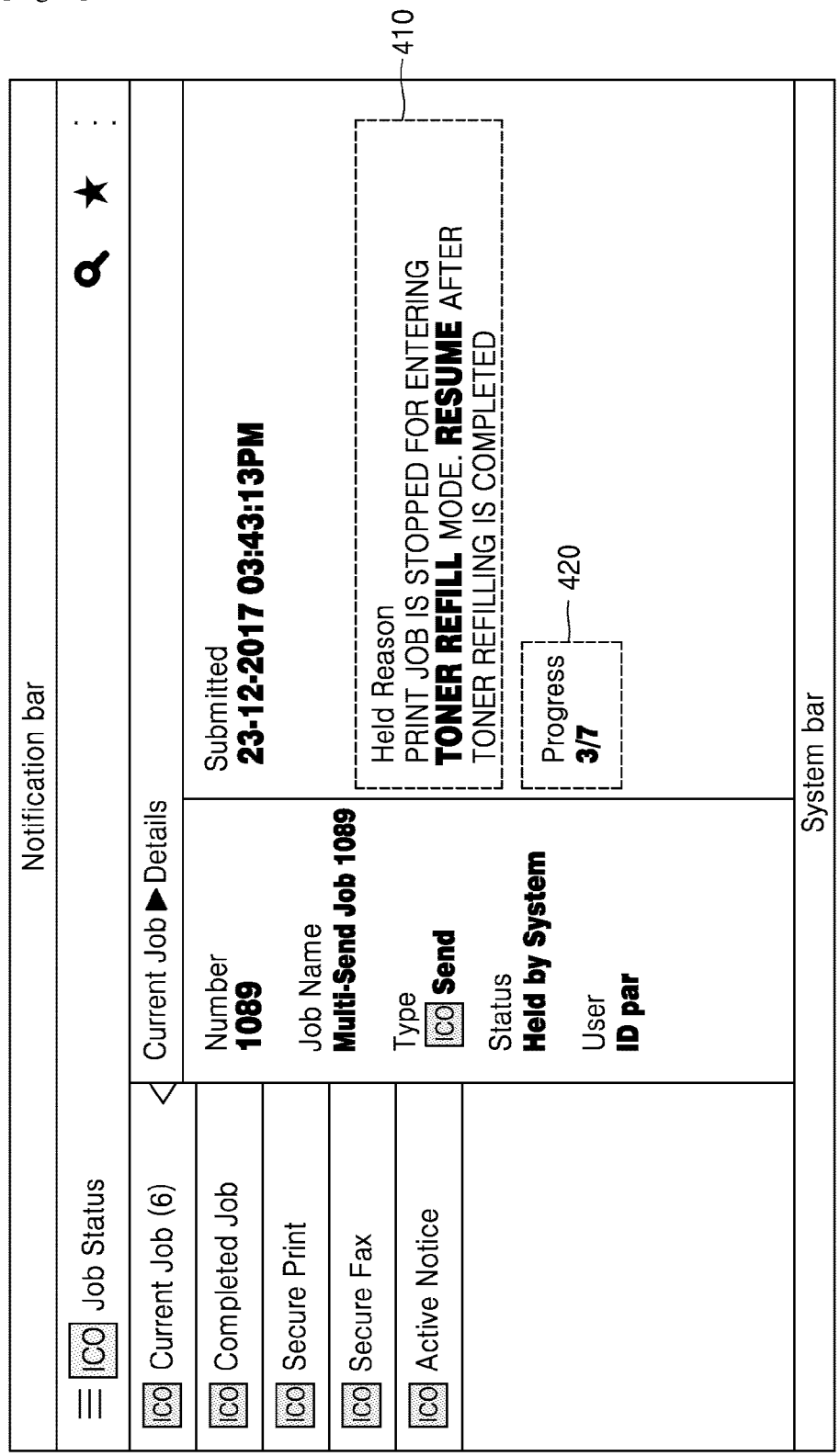

[Fig. 5]
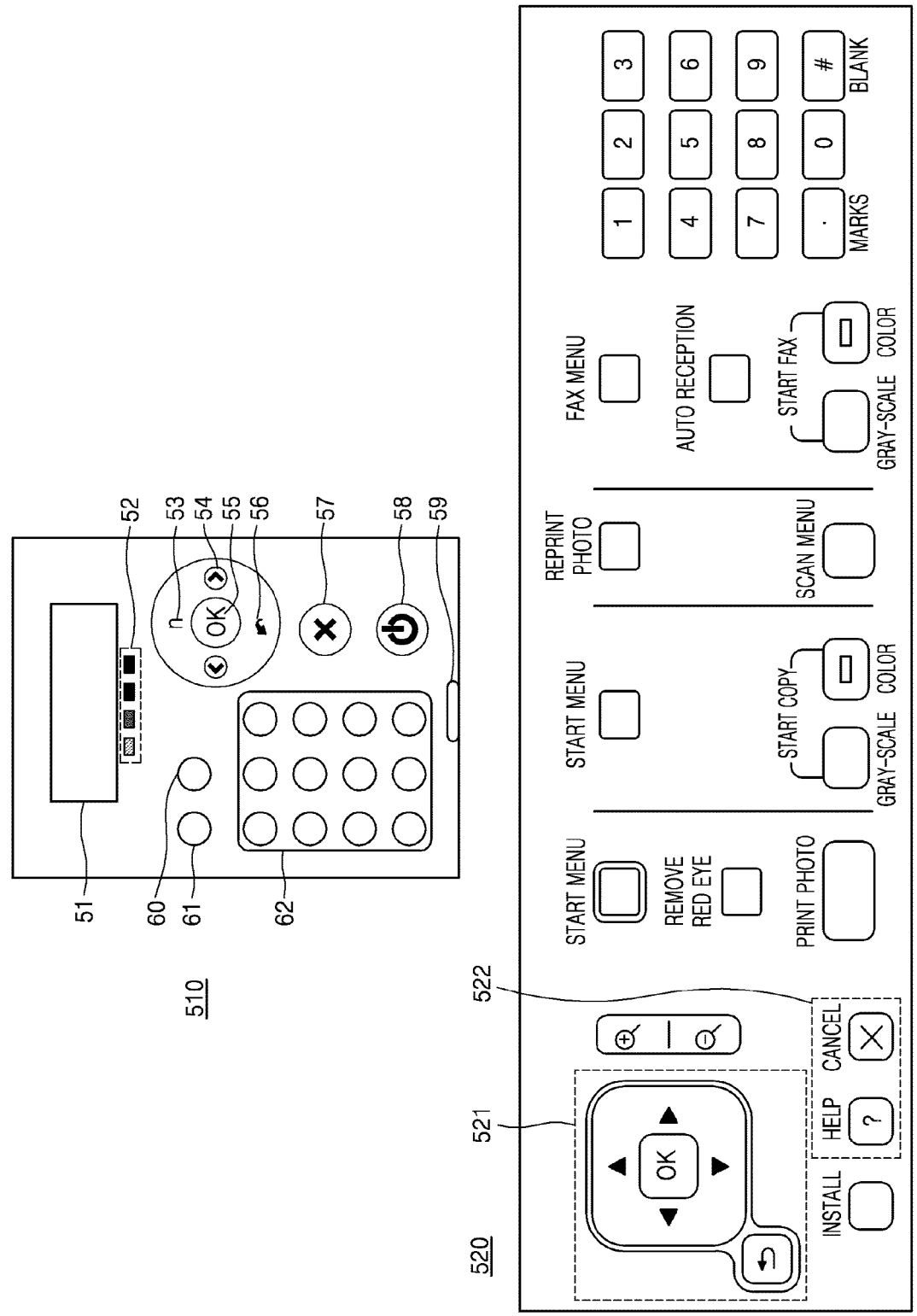

[Fig. 6]
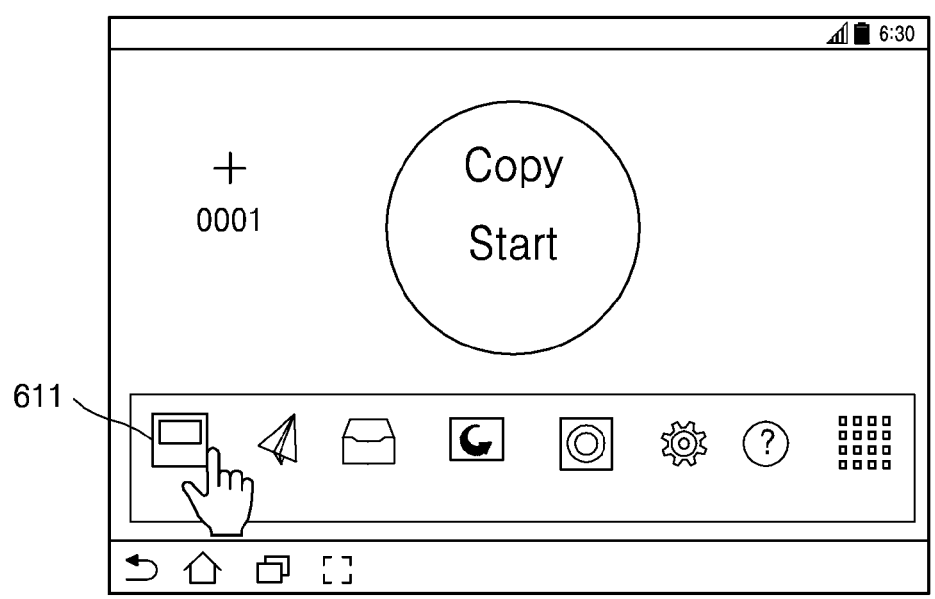
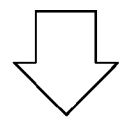
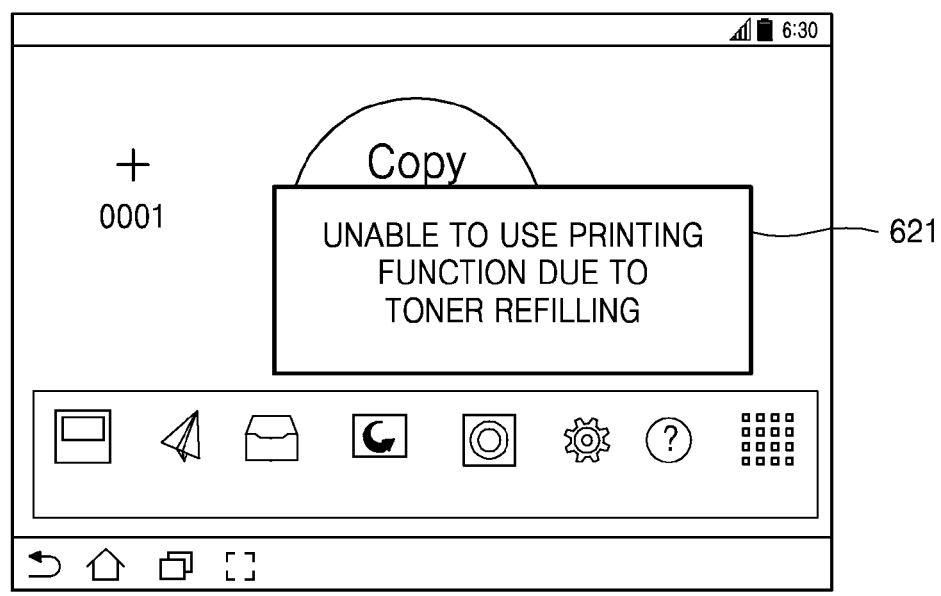

[Fig. 7]
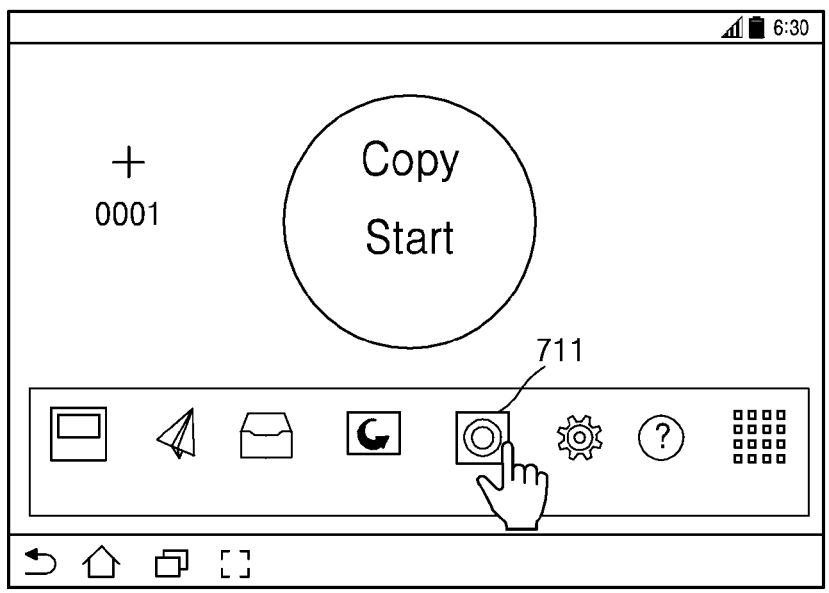
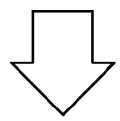
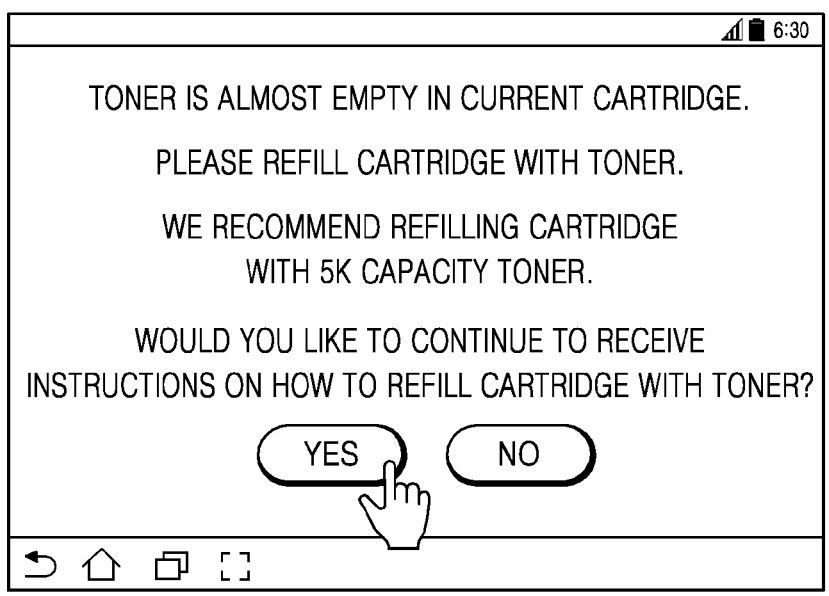

[Fig. 8]

XXXXXXX
Web Service admin | Job Status | Direct Print | Eco OFF | Site Map | Logout(119:59)  English ▶

Infomation   Box   Address Book   Settings   Security   Maintenance   XOA

Restart Device

Security
▶ System Security
   System Administrator
   Feature Management
   Information Hiding
   Restart Device
   Advanced Security

Restart Device

Restart Device:   Restart Now

THIS FUNCTION IS NOT PROVIDED DURING REFILL MODE. "RESTART NOW" BUTTON IS DISABLED. — 810

[Fig. 9]
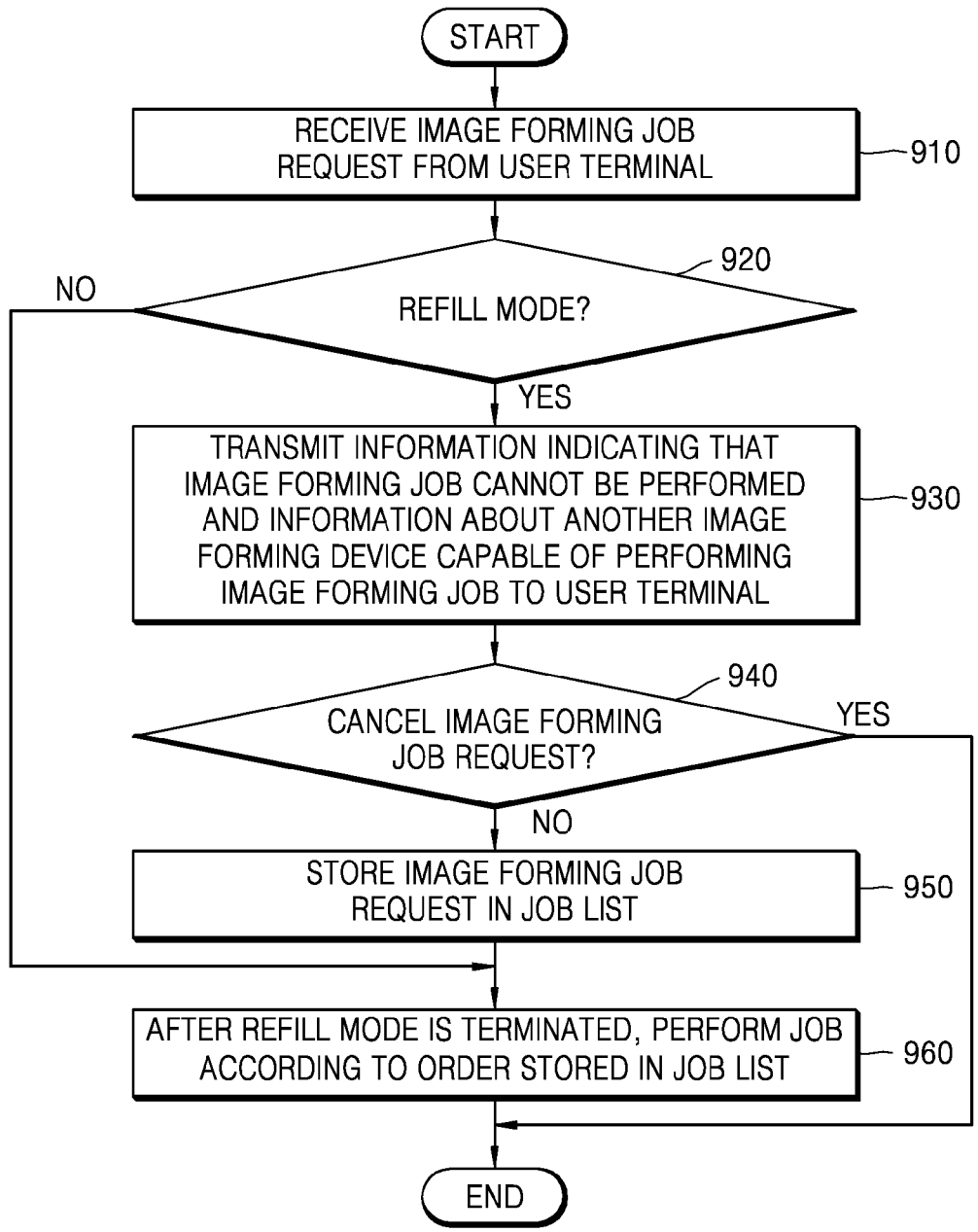

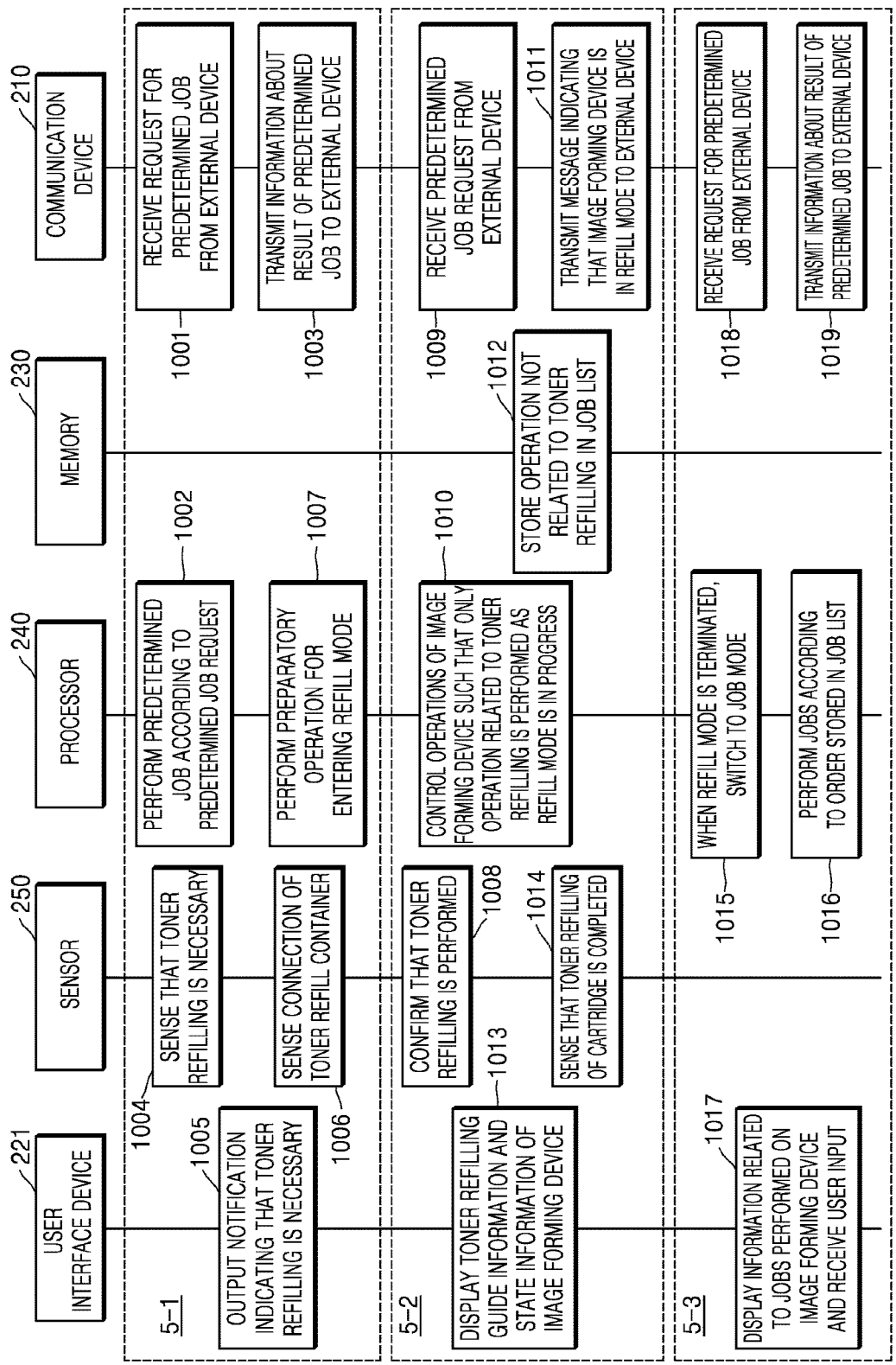
[Fig. 10]

[Fig. 11]
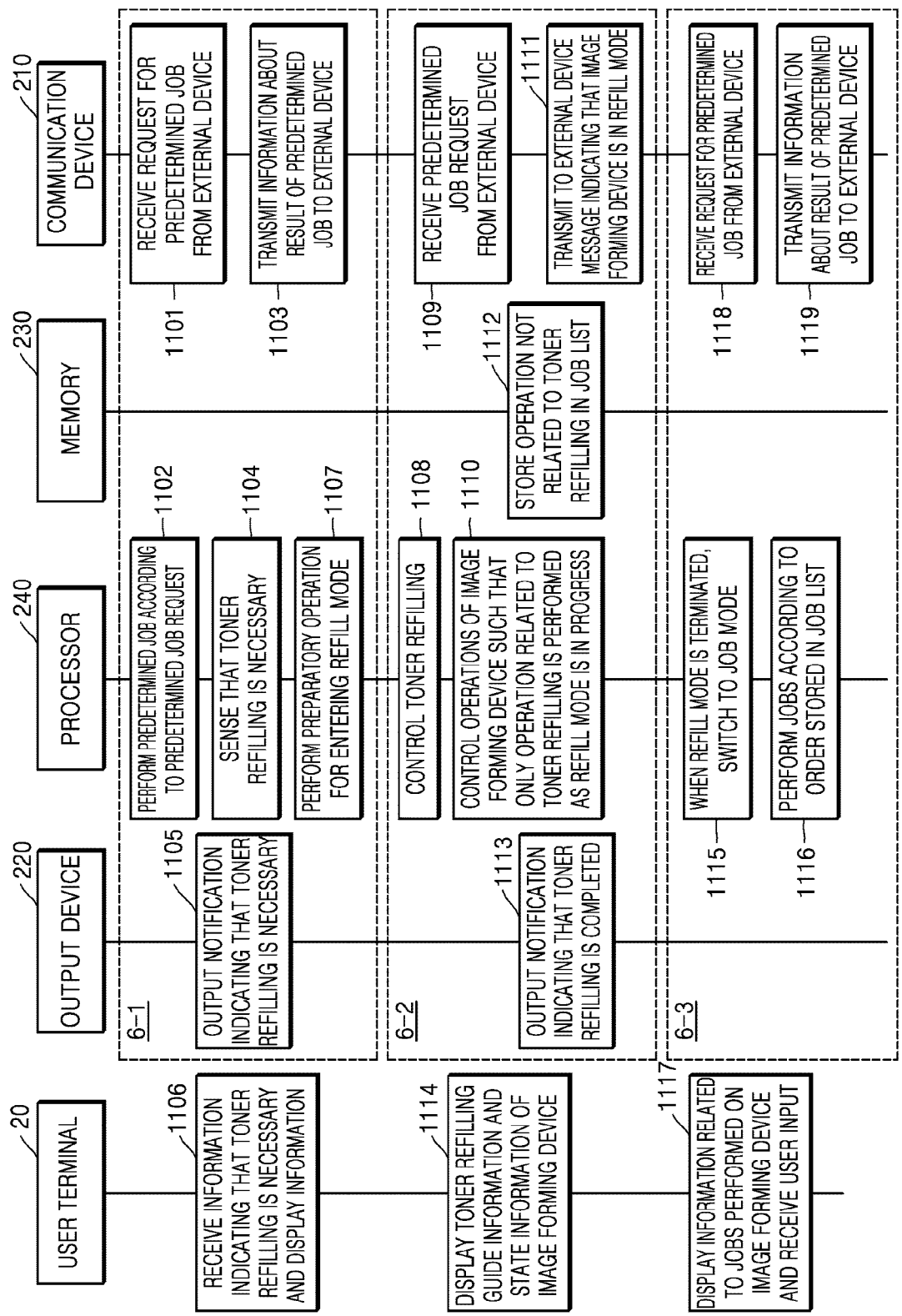

CONTROLLING OPERATION OF IMAGE FORMING APPARATUS ACCORDING TO TONER REFILL MODE

BACKGROUND ART

Generally, a copier or a laser printer performs copying or printing by using a powdered toner in a cartridge. Since the cartridge containing toner is a consumable but relatively expensive, the toner may be refilled into the cartridge.

BRIEF DESCRIPTION OF DRAWINGS

The above and other aspects, features, and advantages of certain examples of the present disclosure will be more apparent from the following description taken in conjunction with the accompanying drawings, in which:

FIG. 1 is a view of an operating method of an image forming device as the image forming device enters a toner refill mode, according to an example;

FIG. 2 is a block diagram of a configuration of an image forming device according to an example;

FIG. 3 is a flowchart of an operating method of an image forming device according to an example;

FIG. 4 is a view for explaining a process by which an image forming device performs a preparatory operation to enter a refill mode, according to an example;

FIG. 5 is a view for explaining an operation by which an image forming device activates only an outer panel related to a refill mode as the image forming device is operated in the refill mode, according to an example;

FIG. 6 is a view for explaining an operation by which an image forming device deactivates a user interface not related to a refill mode as the image forming device is operated in the refill mode, according to an example;

FIG. 7 is a view for explaining an operation by which an image forming device activates a user interface related to a refill mode as the image forming device is operated in the refill mode, according to an example;

FIG. 8 is a view for explaining a process by which a web service of an image forming device is blocked in a server providing the web service to the image forming device as the image forming device is operated in a refill mode, according to an example;

FIG. 9 is a flowchart of an operating method of an image forming device when an image forming job request is received from a user terminal while a refill mode is in progress in the image forming device, according to an example;

FIG. 10 is a flowchart of an operating method of each configuration in an image forming device that performs toner refilling when a user interface device is included in the image forming device, according to an example; and FIG. 11 is a flowchart of an operating method of each configuration in an image forming device that performs toner refilling when a user interface device is not included in the image forming device, according to an example.

Throughout the drawings, it should be noted that like reference numbers are used to depict the same or similar elements, features, parts, components, and structures.

MODE FOR THE INVENTION

An "image forming device" may be any device capable of performing an image forming job, such as a printer, a scanner, a copier, a fax machine, a multi-function printer (MFP), or a display device. Also, "print data" may be data convertible into a printable format in a printer and a "scan file" may be a file generated by scanning an image with a scanner.

Below, a description will be given about examples of the present disclosure with reference to attached drawings such that one with an ordinary skill in the art may easily perform the examples. In this regard, the present disclosure may have different forms and should not be construed as being limited to the descriptions set forth herein. Expressions such as "at least one of," when preceding a list of elements, modify the entire list of elements and do not modify the individual elements of the list.

FIG. 1 is a view of an operating method of an image forming device as the image forming device enters a toner refill mode, according to an example.

Referring to FIG. 1, when toner in a cartridge of an image forming device 10 is exhausted, the image forming device 10 may output a notification indicating that the cartridge needs to be refilled with toner through an output device in the image forming device 10. For example, when the image forming device 10 does not include a user interface device, the image forming device 10 may notify that the toner refilling is necessary by illuminating a light on the image forming device 10, for example a red light. As another example, when the image forming device 10 includes a user interface device, the image forming device 10 may display, on the user interface device, information indicating that toner refilling is necessary.

The image forming device 10 may perform a preparatory operation for entering a refill mode for toner refilling. For example, the image forming device 10 may confirm whether a toner refill container is properly connected to a connecting portion of the image forming device 10.

The image forming device 10 may control operations of the image forming device 10 in accordance with the refill mode. That is, a processor in the image forming device 10 may control the operations of each element of the image forming device 10 according to the refill mode. The image forming device 10 may control the operations of the image forming device 10 such that only an operation related to the toner refilling may be performed as the refill mode is in progress. For example, referring to an image 11 displayed on a user terminal 20 connected to the image forming device 10, the user terminal 20 may display information for guiding toner refilling. As another example, referring to an image 12 displayed on the user interface device of the image forming device 10, when there is a print job request to the image forming device 10 while the image forming device 10 is operated in the refill mode, the user interface device may display a message 621 informing "unable to use a printing function due to the toner refilling".

When the refill mode of the image forming device 10 is completed or otherwise terminated, the image forming device 10 may be switched to a job mode in which a predetermined job may be performed. As the image forming device 10 is switched to the job mode, the image forming device 10 may normally perform the predetermined job.

FIG. 2 is a block diagram of a configuration of an image forming device according to an example.

Referring to FIG. 2, the image forming device 10 may include a communication device 210, an output device 220, a memory 230, and a processor 240. However, not all elements shown in the drawings are necessary elements. The image forming device 10 may be embodied with more or fewer elements than the elements shown in the drawings. Hereinafter, examples of the elements will be described.

The communication device 210 may communicate with an external device. In more detail, the communication device 210 may be connected to a network in a wired or wireless manner and may communicate with the external device. For example, the external device may be a server that manages the image forming device 10 or the user terminal 20 that uses the image forming device 10. The communication device 210 may include a communication module (e.g., a transceiver) that supports one of a variety of wired or wireless communication methods. For example, the communication module may be in the form of a chipset or may be a sticker/barcode (e.g., a sticker including a near field communication (NFC) tag) or the like that includes information necessary for communication. The communication module may be a short-range communication module or a wired communication module.

The communication device 210 may support at least one of, for example, a wireless LAN, wireless fidelity (Wi-Fi), Wi-Fi Direct, Bluetooth, a universal serial bus (USB), a Wired LAN, or NFC, or the like.

The communication device 210 may be connected to the user terminal 20 or the server located outside the image forming device 10 to transmit and receive signals or data.

The output device 220 may display information such as a state of the image forming device 10. For example, the output device 220 may include a display panel, a speaker, a lamp, or the like. In more detail, the display panel may display information related to an operation to be performed in the image forming device 10 or state information of the image forming device 10. Further, the display panel may display capacity information regarding an amount of toner remaining in a cartridge and may also display toner refill guide information. The speaker may output guide information for the image forming device 10. The lamp may adjust an output color so as to indicate a state of the image forming device 10. For example, when toner in the cartridge is exhausted and toner refilling is required, the lamp may emit a red light.

The output device 220 may be implemented as a user interface device. The user interface device may include an input unit for receiving an input for controlling operations of the image forming device 10 and an output unit for displaying operation information and the like of the image forming device 10. As an example, the user interface device may include a touch screen.

The memory 230 may store programs, data or files associated with the image forming device 10. For example, the processor 240 may execute a program stored in the memory 230, read data or a file stored in the memory 230, or store a new file in the memory 230. The memory 230 may store program commands, data files, data structures, or a combination thereof. The memory 230 may store instructions executable by the processor 240.

For example, the memory 230 may include instructions for outputting a notification indicating that the cartridge of the image forming device 10 needs to be refilled with toner, instructions for performing a preparatory operation for entering a refill mode when it is determined that an operation mode of the image forming device 10 is switched to the refill mode for performing an operation of refilling the cartridge with toner, instructions for controlling operations of the image forming device 10 such that only an operation related to the toner refilling is performed according to the refill mode when the preparatory operation is completed, and instructions for switching the operation mode of the image forming device 10 to a job mode for performing a predetermined job in the image forming device 10 when the refill mode is terminated. The processor 240 may execute the instructions stored in the memory 230.

The processor 240 may control an operation of the image forming device 10, and may include at least one processor, such as a central processing unit (CPU). The processor 240 may include at least one specialized processor corresponding to each function, or may be a single integrated processor.

The processor 240 may output a notification indicating that the cartridge of the image forming device 10 needs to be refilled with toner through the output device 220.

For example, the processor 240 may obtain information about the amount of toner remaining in the cartridge through a sensor (not shown) to determine whether toner refilling is necessary. Whether toner refilling is necessary may be determined depending on whether toner has been exhausted in the cartridge, whether the capacity of toner that can be refilled in the cartridge may accommodate the capacity of the toner refill container, or the like. Here, the sensor (not shown) may be a thermocouple (TC) sensor, a photo sensor, or the like.

The processor 240 may detect the amount of toner remaining in the cartridge of the image forming device 10 and determine whether toner refilling is necessary. When it is determined that toner refilling is necessary, the processor 240 may output a notification indicating that toner refilling is necessary and toner refill capacity information through the output device 220. For example, the processor 240 may output a red light to the lamp of the image forming device 10 to inform that toner refilling is necessary. As another example, when the user interface device is provided in the image forming device 10, the processor 240 may display a message indicating that toner refilling is necessary on the user interface device.

In accordance with the notification, when it is determined that the operation mode of the image forming device 10 is switched to the refill mode for refilling the cartridge with toner, the processor 240 may perform the preparatory operation for entering the refill mode.

For example, a sensor (not shown) may be provided in the image forming device 10 to sense whether the toner refill container is connected to the connecting portion of the image forming device 10. When the toner refill container is sensed, the processor 240 may perform a preparatory operation for entering the refill mode of the image forming device 10. As another example, the user interface device of the image forming device 10 may receive an input for switching the operation mode of the image forming device 10 to the refill mode. The processor 240 may perform the preparatory operation for entering the refill mode of the image forming device 10.

With regard to the preparatory operation for entering the refill mode, for example, the processor 240 may confirm whether the toner refill container for toner refilling is properly connected to the connecting portion of the image forming device 10. In addition, the processor 240 may confirm whether the cartridge in the image forming device 10 is mounted. Furthermore, the processor 240 may confirm whether there is a job in progress in the image forming device 10 and prepare the image forming device 10 to enter the refill mode. When there is a job in progress in the image forming device 10, the processor 240 may complete or stop the job in progress and prepare to be in a state in which no job is in progress. Here, the job in progress may be an image forming job, a copy job, a scan job, a fax job, a job for installing or updating an application in the image forming device 10, or the like.

For example, when a first job in progress in the image forming device 10 is a job performed with a plurality of operations, the processor 240 may perform the first job up to a first operation in progress and may stop operations performed after the first operation. The processor 240 may store the state in which the first job is stopped in a job list of the image forming device 10. When the toner refilling in the image forming device 10 is terminated and the refill mode of the image forming device 10 is switched to the job mode, the processor 240 restarts the stopped first job to complete the first job.

The processor 240 may control operations of the image forming device 10 such that only an operation related to toner refilling may be performed according to the refill mode when the preparatory operation is completed.

For example, the processor 240 may activate only an outer panel of the image forming device 10 related to the refill mode while the refill mode is in progress. The processor 240 may not perform an operation corresponding to a first input such as when receiving the first input that presses the outer panel not related to the refill mode. In this case, the processor 240 may output information through the output device 220 indicating that the operation corresponding to the first input may not be performed. In addition, the communication device 210 may transmit information indicating that the operation corresponding to the first input may not be performed to the user terminal 20.

Furthermore, when the output device 220 includes the user interface device, the processor 240 may control the image forming device 10 so that only a user interface of the image forming device 10 is displayed on the user interface device, the user interface being related to the refill mode.

Further, the processor 240 may determine whether an operation requested to be performed in the image forming device 10 through the external device or an input device of the image forming device 10 is an operation related to the toner refilling, and may perform only the operation related to the toner refilling.

In more detail, the processor 240 may determine whether an operation requested to be performed in the image forming device 10 through the external device or the input device of the image forming device 10 is an operation related to the toner refilling.

When the operation requested to be performed in the image forming device 10 is an operation not related to the toner refilling, the processor 240 may control operations of the image forming device 10 such that the operation is not performed while the refill mode is in progress, and may store a command corresponding to the operation in the job list.

Here, the operation not related to the toner refilling may include an operation of performing an image forming job, an operation of performing a copy job, an operation of performing a scan job, an operation of performing a fax job, an operation of installing or updating an application in the image forming device 10, or the like.

When a plurality of operation requests not related to the toner refilling are received by the image forming device 10 while the operation mode of the image forming device 10 is the refill mode, the processor 240 may store commands corresponding to each of the plurality of operation requests in an order requested in the job list. The processor 240 may output a message through the output device indicating that a job requested during the refill mode cannot be performed. In addition, the communication device 210 may transmit a message to the user terminal 20 indicating that the job requested during the refill mode cannot be performed.

For example, when an operation not related to the toner refilling is an operation of installing or updating an application in the image forming device 10, the processor 240 may transmit information indicating that the operation mode of the image forming device 10 has entered the refill mode to the server connected to the image forming device 10 through the communication device 210. In addition, the processor 240 may control the communication device 210 to block reception of information used to install or update the application from the server.

When the operation requested to be performed in the image forming device 10 is an operation related to the toner refilling, the processor 240 may control operations of the image forming device 10 such that the operation is performed.

The processor 240 may output the information about a toner refill guide and the state information of the image forming device 10 through the output device 220 while the refill mode is in progress. For example, when the output device 220 includes a user interface device, the processor 240 may display guide information until a toner refill container is mounted on the image forming device 10 and the toner refilling is terminated through the user interface device.

When the refill mode is terminated, the processor 240 may switch the operation mode of the image forming device 10 to a job mode in which a predetermined job is performed in the image forming device 10.

When the image forming device 10 receives requests for operations not related to the toner refilling while operating in the refill mode, the image forming device 10 may store commands corresponding to the requests in the job list in an order in which the requests are received. When the refill mode is terminated and the operation mode of the image forming device 10 is switched to the job mode, the processor 240 may sequentially perform operations corresponding to the requests based on the job list.

The image forming device 10 may accurately determine a point in time at which toner is refilled in the cartridge and may enter the refill mode of the image forming device 10. While the image forming device 10 is operated in the refill mode, the image forming device 10 may restrictively permit an operation requested to be performed in the image forming device 10 so that toner may be stably refilled in the cartridge.

Various applications or operations performed by the image forming device 10 will be described below. However, various features, which may be clearly understood by those of ordinary skill in the art even without specifying any one of the communication device 210, the output device 220, the memory 230, and the processor 240 of the image forming device 10, may be understood by general implementation, and the scope of the present disclosure is not limited by the physical/logical structures or the terms of specific configurations.

FIG. 3 is a flowchart of an operating method of an image forming device according to an example.

Referring to FIG. 3, the image forming device 10 may output a notification indicating that toner refilling is necessary for the cartridge in the image forming device 10 in operation 310.

The image forming device 10 may detect the amount of toner remaining in the cartridge of the image forming device 10 and determine whether toner refilling is necessary. If it is determined that toner refilling is necessary, the image forming device 10 may provide at least one of the notification indicating that toner refilling is necessary or toner refill capacity information through the output device of the image forming device 10.

In operation 320, in accordance with the notification, when it is determined that the operation mode of the image forming device 10 is to be switched to the refill mode for refilling the cartridge with toner, the image forming device 10 may perform a preparatory operation for entering the refill mode.

The image forming device 10 may confirm whether a toner refill container for toner refilling is properly connected to a connecting portion of the image forming device 10. The image forming device 10 may confirm whether there is a job in progress in the image forming device 10 and prepare the operation mode of the image forming device 10 to enter the refill mode.

For example, when a first job in progress in the image forming device 10 is a job performed with a plurality of operations, the processor 240 may perform the first job up to a first operation in progress and may stop operations performed after the first operation. The image forming device 10 may store a state in which the first job is stopped in the job list of the image forming device 10.

In operation 330, the image forming device 10 may control its operations such that only an operation related to toner refilling may be performed according to the refill mode when the preparatory operation is completed.

The image forming device 10 may activate only an outer panel of the image forming device 10 related to the refill mode while the refill mode is in progress. Furthermore, the image forming device 10 may control its operations so that only a user interface of the image forming device 10 is displayed on the user interface device of the image forming device 10, the user interface being related to the refill mode.

Furthermore, the image forming device 10 may determine whether an operation requested to be performed in the image forming device 10 is an operation related to the toner refilling and may perform only the operation related to the toner refilling.

In more detail, when the first operation requested to be performed in the image forming device 10 is an operation not related to the toner refilling, the image forming device 10 may control operations of the image forming device 10 such that the first operation is not performed while the refill mode is in progress. The image forming device 10 may store a command corresponding to the first operation in a job list. When the refill mode is subsequently completed or otherwise terminated, the image forming device 10 may perform the first operation.

When a second operation requested to be performed in the image forming device 10 is an operation related to the toner refilling, the image forming device 10 may control its operations such that the second operation is performed.

Furthermore, the image forming device 10 may display toner refilling guide information and state information of the image forming device 10 while the refill mode is in progress.

In operation 340, when the refill mode is terminated, the image forming device 10 may switch the operation mode of the image forming device 10 to a job mode in which a predetermined job is performed in the image forming device 10.

FIG. 4 is a view for explaining a process by which an image forming device performs a preparatory operation to enter a refill mode, according to an example.

Referring to FIG. 4, the image forming device 10 may perform a preparatory operation for entering the refill mode. When the image forming device 10 operates in the refill mode, the image forming device 10 may refill a cartridge with toner according to the refill mode. In this case, the image forming device 10 may restrict operations other than the toner refilling in the image forming device 10 for efficient toner refilling. The image forming device 10 may complete jobs in progress or suspend the jobs while leaving some jobs before the operation mode of the image forming device 10 enters the refill mode.

For example, it is assumed that the first job in progress in the image forming device 10 is a 7-page print job. When the operation mode of the image forming device 10 is to enter the refill mode during the print job, the image forming device 10 may perform the print job only up to the third page being printed and stop the print job of the remaining four pages. The image forming device 10 may store state information of the first job, in which first to third page print jobs are completed and fourth to seventh page print jobs are not completed, in the job list.

The image forming device 10 may display, on the user interface device of the image forming device 10, information indicating that the first job, which is the print jobs, has been stopped when the refill mode is in progress. As shown in FIG. 4, the image forming device 10 may display information 410 indicating that the print job is stopped according to the refill mode of the image forming device 10 and information 420 indicating the progress of the print job.

Further, the image forming device 10 may transmit information to the user terminal 20 notifying that the print job is stopped.

FIG. 4 shows an example in which a job in progress in the image forming device 10 is the print job. However, the job in progress may be a copy job, a scan job, a fax job, an application management job in the image forming device 10, or the like.

FIG. 5 is a view for explaining an operation by which an image forming device activates only an outer panel related to a refill mode as the image forming device is operated in the refill mode, according to an example.

Referring to FIG. 5, the image forming device 10 may include an outer panel 510. The outer panel 510 may include a display screen 51, a lamp 52 indicating the state of toner, a menu button 53 in the image forming device 10, a movement button 54 used for selecting information displayed on the display screen 51, a confirmation button 55, a back button 56, a cancel button 57, a power button 58, a lamp 59 indicating a state of the image forming device 10, a button 60 for printing a demo page, a button 61 for switching the consumption of toner to an eco mode, and a numeric keypad 62.

The image forming device 10 may activate only the outer panel 510 of the image forming device 10 related to the refill mode while the refill mode is in progress. For example, in the outer panel 510 of FIG. 5, the image forming device 10 may activate only the lamp 52 indicating a state of toner, the movement button 54, the confirmation button 55, the back button 56, and the cancel button 57, and may deactivate the remaining buttons. Further, the image forming device 10 may display information related to the refill mode on the display screen 51.

In another example, the image forming device 10 may include an outer panel 520. The outer panel 520 may include a plurality of buttons that can control operations of the image forming device 10. When the image forming device 10 operates in the refill mode, the image forming device 10 may activate only a button 521 including a movement button, an OK button, a back button, and a button 522 including a cancel button and a help button. Therefore, even if a user presses a button other than the button 521 and the button 522 while the image forming device 10 is operating in the refill mode, the image forming device 10 does not perform an operation corresponding to the pressed button.

FIG. 6 is a view for explaining an operation by which an image forming device deactivates a user interface not related to a refill mode as the image forming device is operated in the refill mode, according to an example.

Referring to FIG. 6, a user interface device of the image forming device 10 may display a user interface 610 including icons related to operations that can be performed in the image forming device 10. The user interface 610 may display a print job icon, a scan and transfer icon, an icon for providing a space for storing files in the image forming device 10, an icon for providing job state information in the image forming device 10, an icon for providing information about a toner state and toner refilling, an icon for setting an environment in the image forming device 10, and the like.

When the image forming device 10 is operated in the refill mode, the image forming device 10 may deactivate the user interface 610 of the image forming device 10 not related to the refill mode. For example, a user may select a print job icon 611 for printing through the user interface device of the image forming device 10. The image forming device 10 may determine that an operation due to a print job requested by the user is an operation not related to the toner refilling and may not perform the print job. For example, the user interface device of the image forming device 10 may display a screen 620 including a message 621 such as "Print function is not available due to toner refilling" on the user interface 610.

The image forming device 10 may store a command corresponding to the print job requested by the user in a job list. When the refill mode of the image forming device 10 is terminated, the image forming device 10 may perform the print job requested by the user based on the job list.

FIG. 7 is a view for explaining an operation by which an image forming device activates a user interface related to a refill mode as the image forming device is operated in the refill mode, according to an example.

Referring to FIG. 7, when the image forming device 10 is operated in the refill mode, the image forming device 10 may activate a user interface 710 of the image forming device 10 related to the refill mode. For example, a user may select an icon 711 for providing information about a toner state and toner refilling through the user interface device of the image forming device 10.

Based on receiving an input for selecting the icon 711, the image forming device 10 may determine an execution operation of the icon 711 as an operation related to toner refilling, and may execute the icon 711. For example, the user interface device of the image forming device 10 may display a screen 720 including information related to the toner refilling. In more detail, the user interface device of the image forming device 10 may display current capacity information regarding toner remaining in a cartridge, recommendation information regarding the capacity of toner to be refilled, and toner refilling guide information.

Referring to the screen 720 of FIG. 7, the user interface device of the image forming device 10 may receive an input for agreeing to guide a toner refill method. The user interface device of the image forming device 10 may display the toner refilling guide information.

FIG. 8 is a view for explaining a process by which a web service of an image forming device is blocked in a server providing the web service to the image forming device as the image forming device is operated in a refill mode, according to an example.

While the image forming device 10 is operated in the refill mode, the image forming device 10 may control the operation of the image forming device 10 such that only an operation related to toner refilling may be performed. Therefore, the image forming device 10 may control not to perform an operation not related to the toner refilling during the refill mode.

Referring to FIG. 8, a server for providing a security service of the image forming device 10 may be connected to the image forming device 10 to control the image forming device 10 remotely. However, when the operation mode of the image forming device 10 is operated in the refill mode, the server may be disconnected from the image forming device 10 and fail to provide the security service. For example, as shown in FIG. 8, an operation for connecting the server to the image forming device 10 and restarting the image forming device 10 may be blocked. A message 810 informing that the security service cannot be provided while operating in the refill mode of the image forming device 10 may be displayed at a site provided by the server.

FIG. 9 is a flowchart of an operating method of an image forming device when an image forming job request is received from a user terminal while a refill mode is in progress in the image forming device, according to an example.

Referring to FIG. 9, the image forming device 10 may receive an image forming job request from the user terminal 20 in operation 910.

In operation 920, the image forming device 10 may determine whether an operation mode of the image forming device 10 is the refill mode. When the operation mode of the image forming device 10 is the refill mode, the image forming device 10 may perform an operation according to operation 930. When the operation mode of the image forming device 10 is not the refill mode, the image forming device 10 may perform an operation according to operation 960.

In operation 930, the image forming device 10 may transmit, to the user terminal 20, information indicating that an image forming job cannot be performed due to the refill mode. In addition, the image forming device 10 may transmit, to the user terminal 20, information about another image forming device 10 capable of performing an image forming job.

In operation 940, the image forming device 10 may determine whether the image forming job request received from the user terminal 20 is canceled. When it is determined that the image forming job request is not canceled, the image forming device 10 may perform an operation according to operation 950. When it is determined that the image forming job request is canceled, the image forming device 10 may perform an operation according to the refill mode.

In operation 950, the image forming device 10 may store the image forming job request in a job list. In operation 960, after the refill mode of the image forming device 10 is terminated and the operation mode is changed to a job mode, the image forming device 10 may perform a job according to an order stored in the job list. The image forming device 10 may perform an image forming operation according the image forming job request.

FIG. 10 is a flowchart of an operating method of each configuration in an image forming device that performs toner refilling when a user interface device is included in the image forming device, according to an example.

When toner in a cartridge of the image forming device is exhausted, a user may refill the cartridge with toner. In the process of refilling the cartridge with toner, an operation mode of the image forming device may enter a refill mode and the image forming device may control each element of the image forming device according to the refill mode to perform efficient toner refilling.

Referring to FIG. 10, the image forming device may include the communication device 210, a user interface device 221, the memory 230, the processor 240, and a sensor 250. Referring to block 5-1 of FIG. 10, the image forming device may perform a preparatory operation for entering the refill mode before the operation mode of the image forming device enters the refill mode. Referring to block 5-2, while the operation mode of the image forming device is entering the refill mode, the image forming device refills the cartridge with toner, and may control operations of the image forming device such that only an operation related to the toner refilling may be performed. Referring to block 5-3, when the refill mode is terminated, the image forming device may switch the operation mode to a job mode and perform operations according to the job mode.

Operations of each element shown in blocks 5-1, 5-2, and 5-3 are examples, and each element may operate in a different order than the shown order.

Referring to block 5-1, in operation 1001, the communication device 210 may receive a request for a predetermined job from an external device. Here, the predetermined job may include an image forming job, a scan job, a fax job, an operation of installing or updating an application in the image forming device, or the like.

In operation 1002, the processor 240 may perform the predetermined job according to the predetermined job request. In operation 1003, when the predetermined job is terminated, the communication device 210 may transmit information about a result of the predetermined job to the external device. For example, when the predetermined job is an image forming job, the communication device 210 may transmit a message to the external device to inform that the image forming job is terminated.

In operation 1004, the sensor 250 may sense that toner in the cartridge of the image forming device is exhausted and the toner refilling is necessary. In operation 1005, the user interface device 221 may output a notification indicating that the toner refilling is necessary. In operation 1006, the sensor 250 may sense that a toner refill container is connected to a connecting portion of the image forming device. In operation 1007, the processor 240 may perform a preparatory operation for entering a refill mode of the image forming device.

Referring to block 5-2, in operation 1008, the sensor 250 may confirm that toner refilling is performed properly. For example, the sensor 250 may confirm whether the toner refill container is properly connected to the connecting portion of the image forming device. When the toner refill container is not properly connected to the connecting portion of the image forming device, the sensor 250 may output a warning sound.

In operation 1009, while the operation mode of the image forming device is operating in the refill mode, the communication device 210 may receive the predetermined job request from the external device. In operation 1010, the processor 240 may control operations of the image forming device such that only an operation related to the toner refilling may be performed as the refill mode is in progress. The processor 240 may determine whether the predetermined job requested from the external device is an operation related to the toner refilling. In operation 1011, when it is determined that the predetermined job requested from the external device is an operation not related to the toner refilling, the communication device 210 may transmit to the external device a message indicating that the image forming device is in the refill mode and a message indicating that the requested operation cannot be performed according to the refill mode. In operation 1012, when it is determined that the predetermined job requested from the external device is an operation not related to the toner refilling, the memory 230 may store the requested predetermined job in a job list.

In operation 1013, the user interface device 221 may display toner refilling guide information and state information regarding the image forming device. In operation 1014, the sensor 250 may sense that the toner refilling of the cartridge is completed.

Referring to block 5-3, in operation 1015, when the refill mode is completed or otherwise terminated, the processor 240 may switch the operation mode of the image forming device to the job mode. In operation 1016, the processor 240 may perform jobs according to an order stored in the job list. In operation 1017, the user interface device 221 may display information related to the jobs performed on the image forming device. In addition, the user interface device 221 may receive a user input related to the jobs performed on the image forming device.

In operation 1018, the communication device 210 may receive a request for the predetermined job from the external device. The processor 240 may perform the predetermined job according to the request. In operation 1019, when the predetermined job is terminated, the communication device 210 may transmit information about a result of the predetermined job to the external device.

FIG. 11 is a flowchart of an operating method of each configuration in an image forming device that performs toner refilling when a user interface device is not included in the image forming device, according to an example.

Referring to FIG. 11, the image forming device may include the communication device 210, the output device 220, the memory 230, and the processor 240. The user terminal 20 shown in FIG. 11 may perform the same operation as that of the user interface device in the image forming device shown in FIG. 10. Referring to block 6-1 of FIG. 11, the image forming device may perform a preparatory operation for entering a refill mode before an operation mode of the image forming device enters the refill mode. Referring to block 6-2, while the operation mode of the image forming device is entering the refill mode, the image forming device refills a cartridge with toner, and may control operations of the image forming device such that only an operation related to the toner refilling may be performed. Referring to block 6-3, when the refill mode is terminated, the image forming device may switch the operation mode to a job mode and perform operations according to the job mode.

Operations of each element shown in blocks 6-1, 6-2, and 6-3 are examples, and each element may operate in a different order than the shown order.

Referring to block 6-1, in operation 1101, the communication device 210 may receive a request for a predetermined job from an external device. In operation 1102, the processor 240 may perform the predetermined job according to the predetermined job request. In operation 1103, when the predetermined job is terminated, the communication device 210 may transmit information about a result of the predetermined job to the external device. In operation 1104, the processor 240 may detect that toner refilling is necessary. In operation 1105, the output device 220 may output a notification indicating that toner refilling is necessary.

In operation 1106, the user terminal 20 may receive information indicating that toner refilling is necessary from the image forming device and display the information.

In operation 1107, the processor 240 may perform a preparatory operation for entering the operation mode of the image forming device into the refill mode.

Referring to block 6-2, in operation 1108, the processor 240 may control operations of each element of the image forming device so that toner refilling may be performed. The processor 240 may confirm whether the toner refilling is being performed correctly.

In operation 1109, while the operation mode of the image forming device is operating in the refill mode, the communication device 210 may receive the predetermined job request from the external device. In operation 1110, the processor 240 may control operations of the image forming device such that only an operation related to the toner refilling may be performed as the refill mode is in progress. The processor 240 may determine whether the predetermined job requested from the external device is an operation related to the toner refilling. In operation 1111, when it is determined that the predetermined job requested from the external device is an operation not related to the toner refilling, the communication device 210 may transmit to the external device a message indicating that the image forming device is in the refill mode and a message indicating that the requested operation cannot be performed according to the refill mode. In operation 1112, when it is determined that the predetermined job requested from the external device is an operation not related to the toner refilling, the memory 230 may store the requested predetermined job in a job list.

In operation 1113, when the toner refilling is terminated, the output device 220 may output a notification indicating that the toner refilling is completed.

In operation 1114, the user interface device 221 may display toner refilling guide information during the toner refilling and display information indicating that the toner refilling is completed and state information of the image forming device when the toner refilling is completed.

Referring to block 6-3, in operation 1115, when the refill mode is terminated, the processor 240 may switch the operation mode of the image forming device to the job mode. In operation 1116, the processor 240 may perform jobs according to an order stored in the job list.

In operation 1117, the user terminal 20 may display information related to the jobs performed on the image forming device. In addition, the user terminal 20 may receive a user input related to the jobs performed on the image forming device.

In operation 1118, the communication device 210 may receive a request for a predetermined job from the external device. The processor 240 may perform the predetermined job according to the request. In operation 1119, when the predetermined job is terminated, the communication device 210 may transmit information about a result of the predetermined job to the external device.

The operating methods of the image forming device 10 and the user terminal 20 described above may be implemented in the form of a non-transitory computer-readable recording medium storing instructions or data executable by a computer or a processor. The examples can be written as computer programs and can be implemented in general-use digital computers that execute programs using the computer-readable recording medium. The computer-readable recording medium may include read only memory (ROM), random access memory (RAM), flash memory, CD-ROMs, CD-Rs, CD+Rs, CD-DVD-Rs, DVD-Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, or solid-state disks (SSD), and may be any device capable of storing instructions or software, associated data, data files, and data structures, and providing the instructions or software, associated data, data files, and data structures to a processor or a computer such that the processor or computer may execute the instructions.

Although the examples have been described with reference to the accompanying drawings, those of ordinary skill in the art will understand that various changes and modifications may be made therein. For example, the relevant results may be achieved even when the described technologies are performed in a different order than the described methods, and/or even when the described components such as systems, structures, devices, and circuits are coupled or combined in a different form than the described methods or are replaced or substituted by other components or equivalents.

Therefore, the scope of the present disclosure should be defined not by the described examples alone, but by the appended claims and the equivalents thereof.

The invention claimed is:

1. An operating method of an image forming device, the operating method comprising:
    outputting a notification indicating that a cartridge in the image forming device needs to be refilled with toner;
    in accordance with the notification, performing a preparatory operation for entering a refill mode when it is determined that an operation mode of the image forming device is to be switched to the refill mode for refilling the cartridge with toner;
    when the preparatory operation is completed, controlling the image forming device such that only an operation related to the toner refilling is performed according to the refill mode; and
    when the refill mode is terminated, switching the operation mode of the image forming device to a job mode for performing a predetermined job in the image forming device,
    wherein the controlling of the image forming device such that only the operation related to the toner refilling is performed according to the refill mode comprises:
        determining whether an operation requested to be performed in the image forming device is an operation related to the toner refilling;
        when the operation requested to be performed is an operation of installing or updating an application in the image forming device and is not an operation related to the toner refilling, transmitting to a server information indicating that the operation mode of the image forming device has entered the refill mode, the server being connected to the image forming device to install or update the application; and
        blocking reception of information used to install or update the application from the server.

2. The operating method of claim 1, wherein the performing of the preparatory operation for entering the refill mode comprises:
    determining whether a toner refill container for toner refilling is properly connected to a connecting portion of the image forming device;
    determining whether there is an operation in progress in the image forming device; and preparing a state in which the operation mode of the image forming device is able to enter the refill mode.

3. The operating method of claim 1, wherein the controlling of the image forming device such that only the operation related to the toner refilling is performed according to the refill mode further comprises at least one of:
   activating only an outer panel of the image forming device while the refill mode is in progress, the outer panel being related to the refill mode; or
   controlling the image forming device such that only a user interface of the image forming device is displayed on a user interface device of the image forming device, the user interface being related to the refill mode.

4. The operating method of claim 3, wherein the performing of only the operation related to the toner refilling further comprises:
   when a first operation requested to be performed in the image forming device is an operation not related to the toner refilling, controlling operations of the image forming device such that the first operation is not performed while the refill mode is in progress, and storing a first command corresponding to the first operation in a job list; and
   when a second operation requested to be performed in the image forming device is an operation related to the toner refilling, controlling operations of the image forming device such that the second operation is performed.

5. The operating method of claim 1, wherein the outputting of the notification indicating that the toner refilling is necessary comprises:
   detecting an amount of toner remaining in the cartridge of the image forming device and determining whether toner refilling is necessary; and
   when it is determined that toner refilling is necessary, providing a notification indicating that toner refilling is necessary and toner refill capacity information.

6. The operating method of claim 4, wherein the operation not related to the toner refilling comprises at least one of an operation of performing an image forming job, an operation of performing a copy job, an operation of performing a scan job, or an operation of performing a fax job in the image forming device.

7. The operating method of claim 4, further comprising:
   when requests for the operation not related to the toner refilling are received while the refill mode is in progress, storing commands corresponding to the requests in the job list in an order in which the requests are received; and
   performing operations corresponding to the requests in accordance with the job list when the operation mode of the image forming device is switched to the job mode after the refill mode is terminated.

8. The operating method of claim 2, wherein the determining of whether there is an operation in progress in the image forming device, and the preparing of the state in which the operation mode of the image forming device is able to enter the refill mode comprises:
   when a first job in progress in the image forming device is a job performed with a plurality of operations, performing the first job up to a first operation in progress and stopping operations performed after the first operation; and
   storing a state in which the first job is stopped in a job list of the image forming device.

9. The operating method of claim 1, further comprising:
   displaying toner refilling guide information and state information of the image forming device while the refill mode is in progress.

10. A non-transitory computer-readable storage medium storing instructions executable by a processor, the computer-readable storage medium comprising:
    instructions to output a notification indicating that a cartridge in an image forming device needs to be refilled with toner;
    instructions to, in accordance with the notification, perform a preparatory operation for entering a refill mode when it is determined that an operation mode of the image forming device is to be switched to the refill mode for refilling the cartridge with toner;
    instructions to, when the preparatory operation is completed, control the image forming device such that only an operation related to the toner refilling is performed according to the refill mode; and
    instructions to, when the refill mode is terminated, switch the operation mode of the image forming device to a job mode for performing a predetermined job in the image forming device,
    wherein the instructions to control the image forming device such that only the operation related to the toner refilling is performed according to the refill mode comprise:
       instructions to determine whether an operation requested to be performed in the image forming device is an operation related to the toner refilling;
       instructions to, when the operation requested to be performed is an operation of installing or updating an application in the image forming device and is not an operation related to the toner refilling, transmit to a server information indicating that the operation mode of the image forming device has entered the refill mode, the server being connected to the image forming device to install or update the application; and
       instructions to block reception of information used to install or update the application from the server.

11. An image forming device comprising:
    a communication device to communicate with an external device;
    a processor to control operations of the image forming device;
    an output device to output information related to the operation of the image forming device; and
    a memory to store instructions executable by the processor, wherein the processor executes the instructions to:
       output, through the output device, a notification indicating that a cartridge in an image forming device needs to be refilled with toner,
       in accordance with the notification, perform a preparatory operation for entering a refill mode when it is determined that an operation mode of the image forming device is to be switched to the refill mode for refilling the cartridge with toner;
       when the preparatory operation is completed, control the image forming device such that only an operation related to the toner refilling is performed according to the refill mode; and
       when the refill mode is terminated, switching the operation mode of the image forming device to a job mode for performing a predetermined job in the image forming device,
    wherein the processor executes the instructions to control the image forming device such that only the operation related to the toner refilling is performed according to the refill mode by further executing instructions to:
  determine whether an operation requested to be performed in the image forming device is an operation related to the toner refilling;
  when the operation requested to be performed is an operation of installing or updating an application in the image forming device and is not an operation related to the toner refilling, transmit to a server information indicating that the operation mode of the image forming device has entered the refill mode, the server being connected to the image forming device to install or update the application; and
  block reception of information used to install or update the application from the server.

12. The image forming device of claim 11, wherein the processor executes the instructions to:
  determine whether a toner refill container for toner refilling is properly connected to a connecting portion of the image forming device;
  determine whether there is an operation in progress in the image forming device; and
  prepare a state in which the operation mode of the image forming device is able to enter the refill mode.

13. The image forming device of claim 11, wherein the output device comprises a user interface device, and the processor executes the instructions to perform at least one of:
  activating only an outer panel of the image forming device while the refill mode is in progress, the outer panel being related to the refill mode; or
  controlling the image forming device such that only a user interface is displayed on the user interface device, the user interface being related to the refill mode.

14. The image forming device of claim 13, wherein the processor executes the instructions to:
  when a first operation requested to be performed in the image forming device is an operation not related to the toner refilling, control operations of the image forming device such that the first operation is not performed while the refill mode is in progress, and store a first command corresponding to the first operation in a job list; and
  when a second operation requested to be performed in the image forming device is an operation related to the toner refilling, control operations of the image forming device such that the second operation is performed.

15. The image forming device of claim 11, wherein the processor executes the instructions to:
  detect an amount of toner remaining in the cartridge of the image forming device and determine whether toner refilling is necessary; and
  when it is determined that toner refilling is necessary, provide a notification indicating that toner refilling is necessary and toner refill capacity information.

16. The image forming device of claim 14, wherein the operation not related to the toner refilling comprises at least one of an operation of performing an image forming job, an operation of performing a copy job, an operation of performing a scan job, or an operation of performing a fax job in the image forming device.

17. The image forming device of claim 14, wherein the processor executes the instructions to:
  when requests for the operation not related to the toner refilling are received while the refill mode is in progress, store commands corresponding to the requests in the job list in an order in which the requests are received; and
  perform operations corresponding to the requests in accordance with the job list when the operation mode of the image forming device is switched to the job mode after the refill mode is terminated.

18. The image forming device of claim 12, wherein the processor executes the instructions to:
  when a first job in progress in the image forming device is a job performed with a plurality of operations, perform the first job up to a first operation in progress and stop operations performed after the first operation; and
  store a state in which the first job is stopped in a job list of the image forming device.

19. The image forming device of claim 11, wherein the processor executes the instructions to:
  display toner refilling guide information and state information of the image forming device while the refill mode is in progress.

* * * * *